(12) United States Patent
Baldwin, Jr.

(10) Patent No.: US 6,991,017 B2
(45) Date of Patent: Jan. 31, 2006

(54) LIGHT WEIGHT CABLE BEAD CORE

(75) Inventor: Donald William Baldwin, Jr., Norton, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 371 days.

(21) Appl. No.: 10/621,584

(22) Filed: Jul. 17, 2003

(65) Prior Publication Data
US 2004/0016496 A1   Jan. 29, 2004

Related U.S. Application Data

(62) Division of application No. 10/165,073, filed on Jun. 7, 2002, now Pat. No. 6,622,766.

(51) Int. Cl.
| | |
|---|---|
| B60C 15/04 | (2006.01) |
| D07B 1/06 | (2006.01) |
| D07B 1/18 | (2006.01) |

(52) U.S. Cl. ....................... 152/540; 245/1.5

(58) Field of Classification Search ................ 152/540; 245/1.5; 57/21, 201
See application file for complete search history.

(56) References Cited

U.S. PATENT DOCUMENTS

| | | | |
|---|---|---|---|
| 1,463,978 A | 8/1923 | Somerville | |
| 3,861,442 A | 1/1975 | Bertrand | |
| 3,977,174 A * | 8/1976 | Boileau | .................... 57/216 X |
| 6,571,847 B1 * | 6/2003 | Ueyoko | .................... 152/540 |

FOREIGN PATENT DOCUMENTS

| | | |
|---|---|---|
| BE | 373247 | 10/1930 |
| DE | 2364274 A | 6/1975 |
| DE | 4137726 | 5/1992 |
| FR | 2232455 | 1/1975 |
| GB | 1069461 | 5/1967 |
| GB | 1251928 | 11/1971 |
| JP | 4183613 | 6/1992 |
| JP | 4183614 | 6/1992 |
| JP | 5163686 | 6/1993 |
| JP | 7068662 A2 | 3/1995 |
| JP | 7096720 A2 | 4/1995 |
| JP | 11321247 | 11/1999 |
| JP | 2000225817 | 8/2000 |

* cited by examiner

*Primary Examiner*—Adrienne C. Johnstone
(74) *Attorney, Agent, or Firm*—Nancy T. Krawczyk

(57) ABSTRACT

A light weight cable bead core 30 is described having an inner core 33 made of a metal wire 34 with an outer sheath 35 of steel cord wires 36. Each cord 36 is made of a plurality of filaments 37. The bead core 30 is particularly suited for heavy-duty service conditions in tires 100 for aircraft, off-road equipment, and commercial trucks.

1 Claim, 5 Drawing Sheets

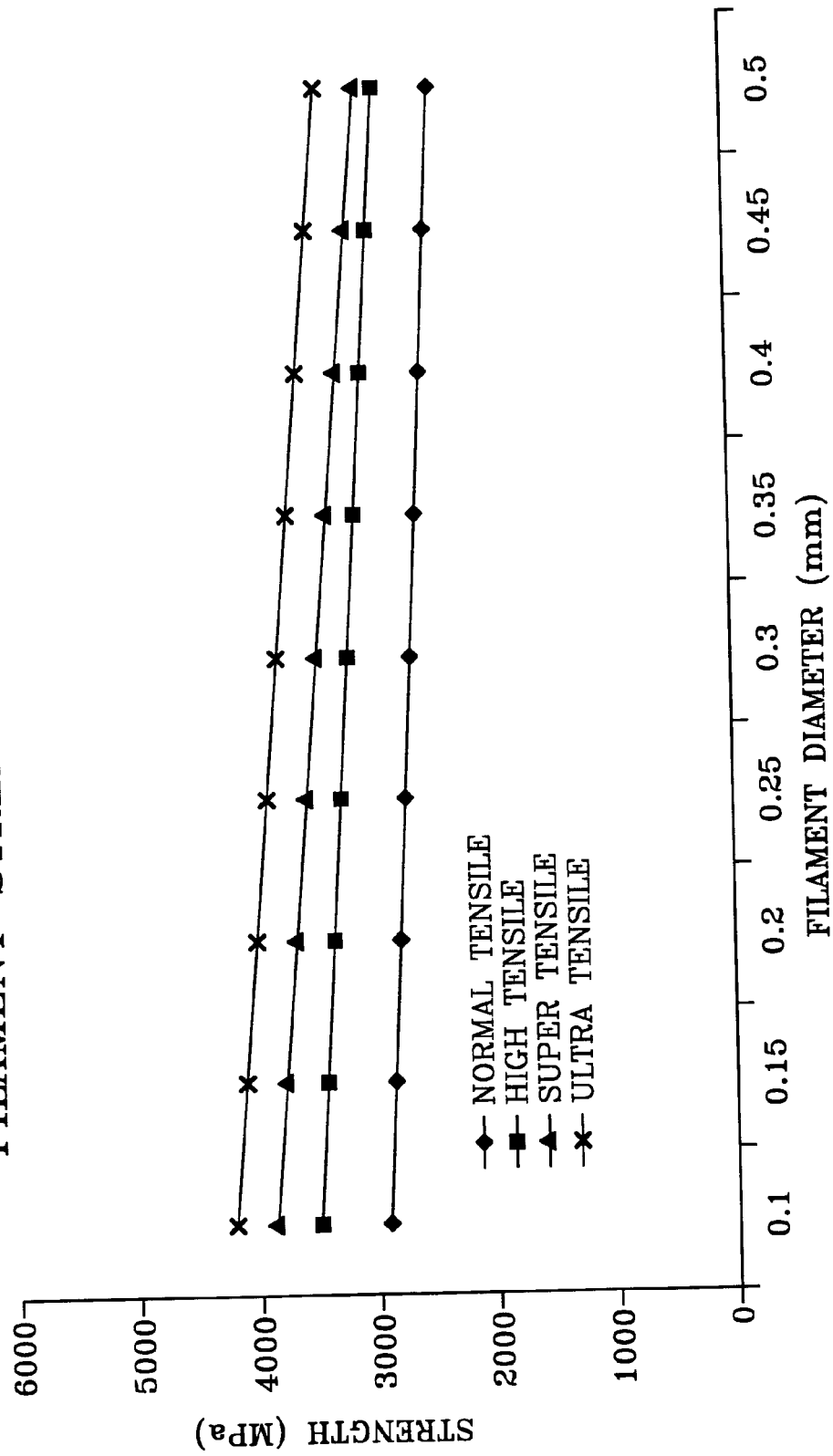

LIGHT WEIGHT CABLE BEAD CORE

This is a Divisional of application Ser. No. 10/165,073, filed Jun. 7, 2002, now U.S. Pat. No. 6,622,766 filed Sep. 23, 2003.

TECHNICAL INVENTION

This invention relates to a lightweight bead for radial ply tires, more particularly a heavy-duty lightweight bead for tires subjected to very heavy loads and high pressures.

BACKGROUND OF THE INVENTION

Annular tensile members, commonly referred to as tire bead cores, are designed to securely hold the tire on the rim during use.

A tire rim generally has a rim flange and a bead seat specifically designed to hold the bead portion of the tire in place.

These rims are designed to specific dimensions and tolerances as prescribed by various industry associations. In the United States the Tire & Rim Association sets all rim standards. In Europe, the European Tire and Rim Association sets the rim standards. In Japan the J.P.T.O. sets these standards. For the most part, these rim standards globally insure proper tire fits can be reliably designed. This standardization enables tire makers to design tire beads that safely can be mounted and retained on the rims.

The tire beads provide a radially inner portion between the bead core and the rim that is radially compressed and as this portion is compressed the bead core is placed in tension. Radial compression occurs as the tire is mounted on a tapered rim seat by the action of the internal pressure of the tire pushing the bead axially outwardly toward the vertical bead flange. The tapper on rims typically are about 5° or in the case of commercial truck tires as much as 15°.

What actually makes the bead retaining forces achieve very high values is the bead core. Typically the bead cores are made of one or more steel wires wound in an annular configuration to form a bead bundle in the shape of a circular hoop of any variety of cross-sections. Some bead cores are circular in cross-section, others are square, rectangular, hexagonal or variations of those shapes.

In the past, attempts have been made to make synthetic beads or non-ferrous type bead cores. These bead cores have been limited to use in toys or bicycles. The use of synthetic bead cores achieve a light weight structure but generally at the expense of lower tensile strength or bead wire fretting.

Recently in several Japanese patent publications, the use of a combination of steel wire and aramid cores has been proposed as a lightweight bead core. Yokohma Rubber Company, LTD, in JP4078703, suggests using an arimid fiber drawn in a non-twisted state as a core member which is wound by a steel wire in a spirally wound state on the outside of the arimid core. The result is a circular bead core having a lighter weight than an all steel bead core of similar cross section.

Similarly Sumitomo Rubber Ind., LTD in JP4183614 and Toyo Tire in JP7096720 also use a combination of aramid fiber and steel wire to make a bead core. The Toyo design requires at least a first layer on the core inside diameter being of steel wire. The subsequent layers can be made of aramid fiber cords. This insures the bead does not experience a lowering of lifting force when compared to an all-synthetic bead core. In the Sumitomo concept alternating layers of Aramid cords and steel wires are used. In one configuration, the steel wire and aramid cords are arranged in vertical or radial layers and in another embodiment the aramid and steel are layered horizontally to make a bead core of square or rectangular cross-section.

In each case, care is taken to insure the synthetic fiber is used in a non-twisted configuration. The primary issue with synthetic cords is that when provided in a cable that has the cords twisted there is created several problems. The first is called creep under load. The synthetic cables or cords will stretch under load and as the plastic flows the restraining force actually will lower with time, accordingly the use of steel in a radially innermost layer is essential if bead retention forces are to be reliably constant. A second problem with such beads is a pheoromina called fretting. Aramid, in particular, and many other plastics have a condition where small brittle fractures occur if the cords are placed in compression. Cabling such cords actually increase the likelihood of creating these fractures. Generally, aramid cords are typically used in the carcass plies and because repeated exposure to compression stresses can create cord breakage absent special design considerations. In a bead core, almost all of the loads are in tension except when the bead is helically or spirally wound. In those cases the cords work against each other creating small bending forces, which over time result in minute abrading friction of the adjacent cords. This gives rise to a phenomena referred to as fretting.

The lightweight cable beads show promise in small, lightly loaded tires for bicycles but heretofore have not been considered practical in very heavy-duty load conditions.

In radial airplane tires where lightweight issues are very important. The use of steel bead cores has been the practice. The tires are inflated to about 200 psi (14.1 kg/cm$^2$), and can experience impact loads of 50,000 lb$_f$ (22,680 kg) or greater.

In such tires, tests are conducted to insure adequate safely margins exist. Typically the tires annular tensile members are designed to exceed the strength of the tire's carcass and belt structure. Hydraulic burst test are conducted to failure where water is injected into the tire until the tire fails at some very high pressure. Typically the beads survive these tests with the failure mode occurring in the belts or the plies.

In large off-road tires used in earthmoving equipment. The tire's beads are constructed of steel wire formed in large bundles. The tires operated at very high pressures, typically 100 psi and the bead bundles may measure greater than an inch (2.54 cm) across in cross-section thickness and comprised of hundreds of steel wires.

Similarly commercial truck tires use all steel bead cores. These tires run at about 95 psi or greater and must carry very large loads. In each case the use of all steel bead cores has been the accepted practice.

While lightweight tires are generally understood to run cooler, it has been generally understood that those benefits are derived from a reduction of carcass rubber or tread rubber and not by a reduction in the weight of the bead core.

For these reasons the interest in lightweight bead cores for heavy duty tires has received little attention. Only in aircraft tires has the tire weight issue been considered sufficiently important.

The present invention is directed to a lightweight bead core for heavy-duty tires. The invention was first formulated for an advanced lightweight radial aircraft tire. The analysis has shown that the concept is so cost effective and durable that it can be used in almost any heavy-duty tire application.

The object of the invention was to provide a lightweight, yet high strength bead core for severe service applications such as aircraft tires.

A further object of the invention was to provide a low cost bead core that was competitively priced relative to the all steel bead cores.

These features as well as others are described in the invention described hereinafter.

SUMMARY OF THE INVENTION

A pneumatic radial tire having a bead portion provided therein has a cable bead core formed by a plurality of sheath wires enveloping a central core.

The sheath is made of cords or steel cord having at least three filaments and the central core is made from a bead wire of steel or an alloy of metal having a weight less than steel. The central core material is selected from the group of steel, titanium, aluminum, magnesium, or other metal alloy, as a composite or synthetic cores.

In one embodiment, the bead core has the sheath wires helically wrapped around the central core. The bead core can be of circular, rectangular, square, or hexagonal cross-section, or a combination of such cross-sectional shapes.

The central core can be a single wire or rod wrapped 360° or more. Alternatively, the central core may have a plurality of wires wrapped 360° or more.

DEFINITIONS

"Apex" means a non-reinforced elastomer positioned radially above a bead core.

"Aspect ratio" of the tire means the ratio of its section height (SH) to its section width (SW) multiplied by 100% for expression as percentage.

"Axial" and "axially" means lines or directions that are parallel to the axis of rotation of the tire.

"Bead" means that part of the tire comprising an annular tensile member wrapped by, or otherwise attached to ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17° to 33° with respect to the equatorial plane of the tire.

"Bias ply tire" means a tire having a carcass with reinforcing cords in the carcass ply extending diagonally across the tire from bead core to bead core at about a 25°–50° angle with respect to the equatorial plane of the tire. Cords run at opposite angles in alternate layers.

"Carcass" means the tire structure apart from the belt structure tread, under tread, and sidewall rubber over the plies, but including the beads.

"Circumferential" means lines or direction extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" means a reinforcement structure located in the bead portion of the tire.

"Cord" means one of the reinforcement strands of which the plies or cable bead core in the tire are comprised. Cord as used herein means a structure having multiple filaments.

"Equatorial plane (EP)" means the plane perpendicular to the tire's axis of rotation and passing through the center of its tread.

"Flipper" means a reinforced fabric wrapped about the bead core.

"Footprint" means the contact patch are area of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint including non-contacting portions such as grooves.

"Normal inflation pressure" refers to the specific design inflation pressure and load assigned by the appropriate standards organization for the service condition for the tire.

BRIEF DESCRIPTION OF THE DRAWINGS

The invention will be described by way of example and with reference to the accompanying drawings in which:

FIG. 9 is a chart showing various strengths of steel cord filaments.

DETAILED DESCRIPTION OF THE INVENTION

Figure 1:
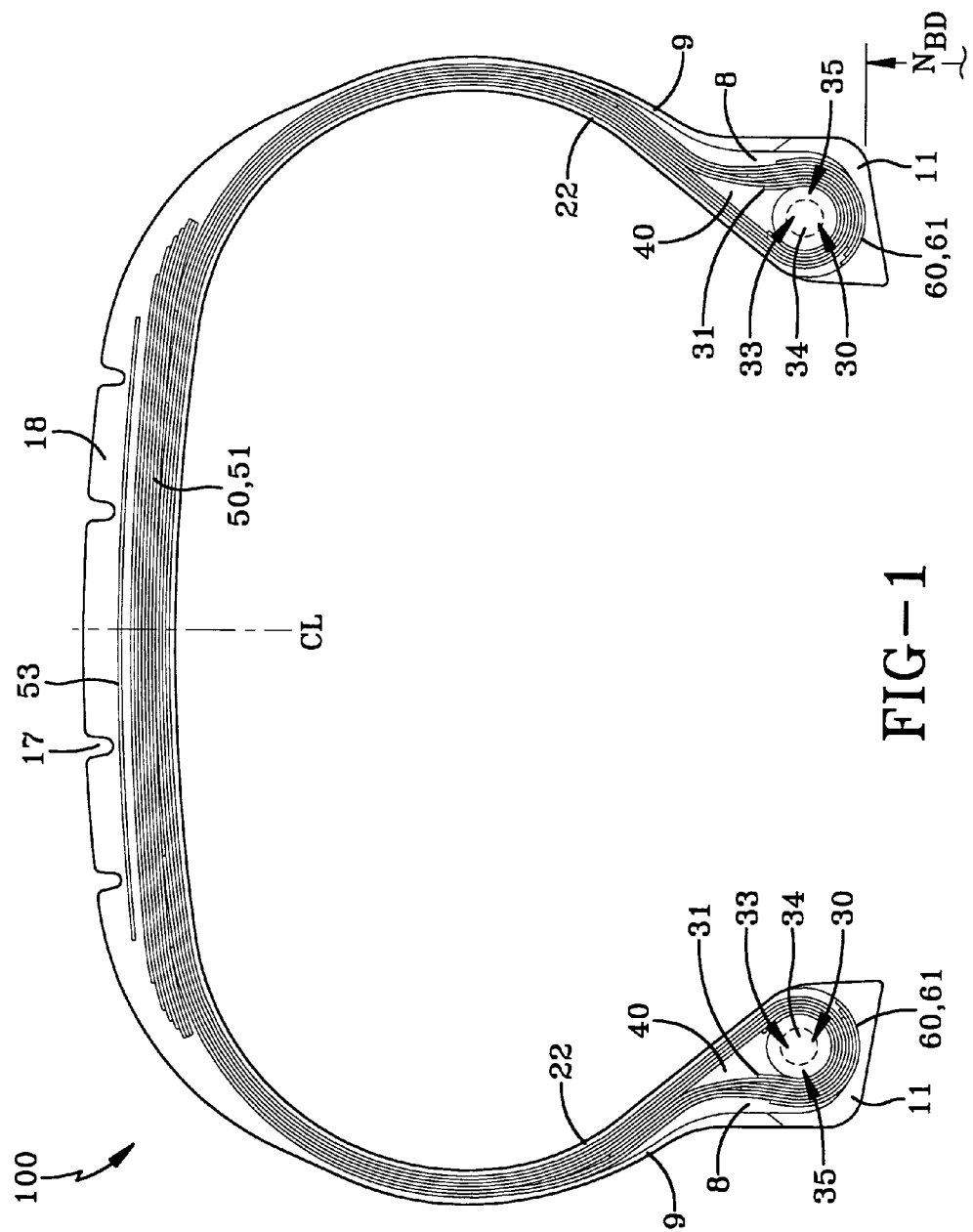
FIG. 1 is a cross-sectional view of a pneumatic radial tire employing the bead cores of the present invention.

With reference to FIG. 1, a cross-sectional view of a radial ply tire 100 is shown. The tire 100, as illustrated, is a construction for use as an aircraft tire. The tire 100 by way of example is a radial aircraft tire exposed to high internal pressures and tremendous loads. Other such tires such as earthmover, commercial truck and farm tires are also ideally suited for using the bead core of the present invention.

The tire 100 is a radial ply tire of the tubeless type construction. The tire 100 has an air imperious inner liner 22 which contains fluid or air under pressure. Radially outward of the inner liner 22 are one or more radial plies 20. Each ply 20 extends from an annular tensile member commonly referred to as a bead core 30. As shown the plies 20 wrap about the bead core 30 either turning axially out and up forming a ply turnup or alternately turning axially in and under the bead core 30. Radially above the bead core 30 is a rubber apex 40. The tire bead is supplemented by a reinforcement chipper ply 60 of textile cords 61. The chipper 60 protects the plies 20 against injury during rim mounting. Preferably radially below the chipper 60 is a chafer 11. Axially outward of the chipper 60 and the plies 20 is an elongated strip 8 of elastomeric material extending from radially inward of the bead adjacent the chafer to a radial location at or slightly above one or more of the ply turnups. This strip 8 is interposed between the sidewall 9 and the ply 20. Adjacent the bead core 30 and the plies is a flipper 31 in the exemplary tire as illustrated.

Radially outward of the carcass plies 20 is a plurality of belt reinforcing layers 50, each layer is reinforced with cords 51.

A fabric layer 53 is shown radially outward of the belt layers 50.

Above the fabric layer 53 is a tread 18 as shown, the tread 18 has a plurality of circumferentially continuous grooves 17.

The tire structure 100 as mentioned is an example of one type of tire structures that can utilize the cable bead core 30, of the present invention. Although the tire 100 as shown is an aircraft tire structure, the invention is usable in any highly loaded heavy-duty tire structure.

With reference to FIGS. 2A through 2D, the cable bead core 30 of the present invention is shown. As illustrated the central core 33 is shown as a single wire or rod 34 wound at 360°. The ends of the wire 34 are preferably welded to form one continuous hoop or central core 33. The central core 33 is made of steel wire or an alloy of aluminum, or other lightweight metal alloy such as magnesium, titanium, or any metal alloy having a weight less than steel. Additionally, composite materials or even synthetics may be used.

Figure 2A:
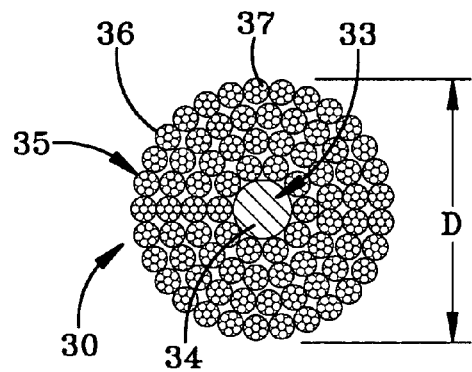
FIGS. 2A through 2D are cross-sectional views of the present invention showing the bead core in circular cross-section having a central core of a single wire or rod wound 360° and a sheath of steel cord, each cord having at least three filaments.
Figure 2B:
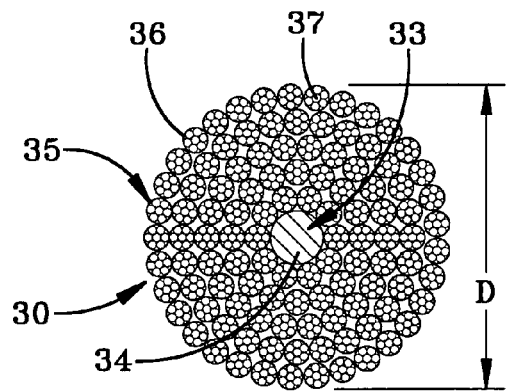
Figure 2C:
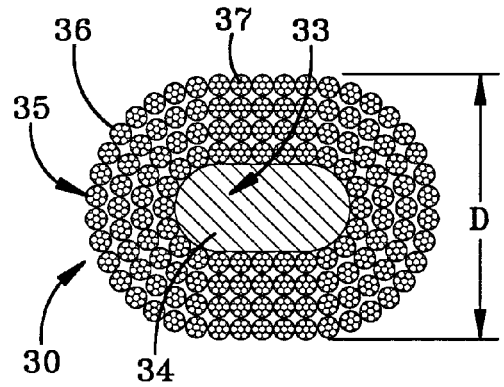
Figure 2D:
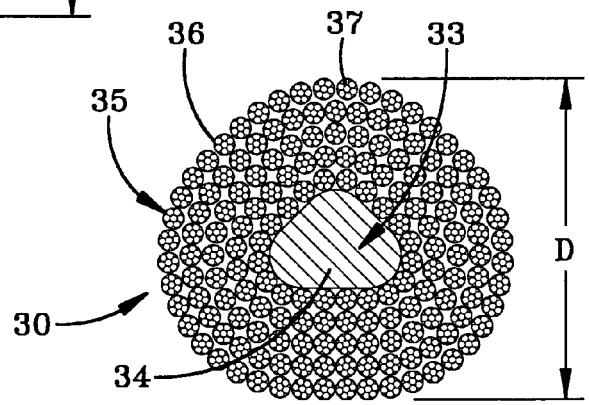

In FIGS. 2A and 2B the central core 34 has a circular cross section. In FIG. 2C the central core 34 is oblong and in FIG. 2D the central core is shown in a triangular shape. The resultant cable cords in the sheath show the shape of the cores as illustrated.

Aluminum is an ideal alloy in that it provides excellent corrosion resistance when used with steel and it is very strong at the welded joint. Aluminum can be tempered, further increasing the tensile strength of the central core 33. The tensile strength of 6061 aluminum alloys can vary in the range of 125 MPa for $6061T_0$ to 310 MPa for $6061T_6$.

Aluminum alloys in $6061T_4$ range have superb strength ratios while maintaining excellent ductility.

As further illustrated the central core 33 is wrapped by a sheath of two or more sheath layers 35, preferably at least two sheath layers 35. The cords 36 of the sheath layers are steel filaments 37 formed into cords 36 helically or spirally wound about the central core 33.

Figure 8:
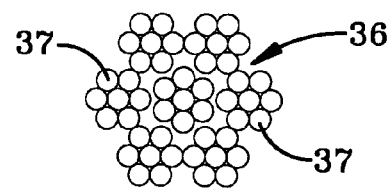
FIG. 8 is an enlarged cross-sectional view of a cord of the present invention.

The cords 36 as illustrated in FIG. 8 are made of filaments 37. As one example the filaments are arranged in 3×7×0.25 mm construction, although any number of wire cord constructions are possible. As shown the 7×7×0.25 mm cord 36 has 49 filaments 37 as shown in FIG. 8.

Figure 3:
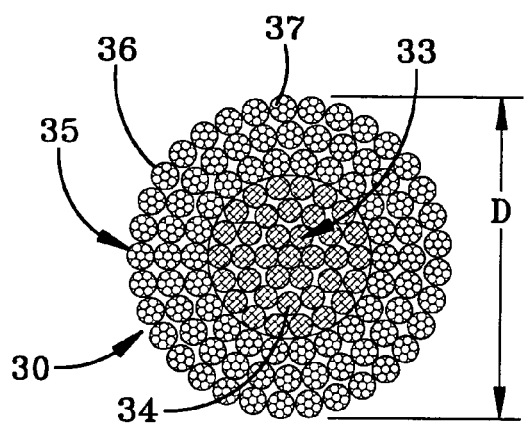
FIG. 3 is a cross-sectional view of a bead core of the present invention showing the bead core in circular cross-section having a central core demonstrating either a single wire wound in multiple turns or a plurality of wires wound at least 360° or more.

The cable bead core 30 of FIG. 3 is virtually the same as the example shown in FIG. 2A with the noted difference that the wire 34 of the central core 33 can be constructed of a single alloy wire 34 wound numerous times to form a central bead core bundle 33, or the illustrated bead core 30 could be multiple wires 34 wrapped multiple turns to make the central core 33. In either design construction of multiple windings or turns the central core 33, as illustrated, can be preformed and then the outer steel sheath layers 35 can be wrapped about the wires 34 of the central core 33. It is noted that any of the central cores 33 shown in FIGS. 2A through 2D could be made with multiple windings of smaller diameter wire 34 as shown in FIG. 3.

Figure 7:
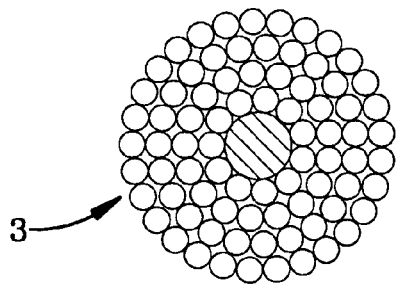
FIG. 7 illustrates a prior art bead core cross-section having all steel wires wound helically about a central core of steel.

In each of the bead cores 30 of FIGS. 2A through 2D and FIG. 3. It is pointed out that the outside diameter D of the circular cross section can be made the same as the prior art bead core 3 of FIG. 7. In FIG. 7, the all steel bead core 3 as illustrated has a construction of wires 1×6.0 mm+ (10+17+23+29)×2.2 mm which has an outside diameter D of 23.6 mm. By way of example it is shown that the cable bead core 30 of the present invention can be made having about the same outside diameter D. This resulting design means that the overall engineering of the rest of the tire design can be unaltered. This means that the present invention can be, if so desired substituted into existing tire designs without requiring extensive tire design changes. This advantage of the present design means that conversions to lightweight cable bead cores 30 can be quickly and inexpensively implemented. Such critical engineering considerations as ply line control, turn up ending locations and bead core dimensions can remain unchanged. It is well recognized that the bead to rim flange fitment is a sophisticated design. A peak pressure occurs almost directly below the bead core between the bead core and the rim bead seat. Also a high pressure occurs along the rim flange. Accordingly, engineers like the bead core diameter D to be sufficiently large to keep the pressure distribution over a large area. If one would try to reduce the bead core diameter to achieve a lighter weight tire the peak contact pressure would almost by necessity require higher pressures below the bead core to maintain the same amount of overall forces. This is true because the location of a smaller bead core would move the peak contact pressure radially inward and axially outward. This results in a smaller pressure distribution profile area. The only way to compensate for this is by increasing the peak pressures. All these problems are combined with the above changes to the overall tire structure. For these reasons the present invention shows great advantages for easy implementation into existing tire designs. The only critical requirement is establishing the amount of tensile strength the cable bead core 30 must exhibit to satisfy the design safety margins selected by the engineer.

As shown in FIG. 7 the all steel prior art bead wire core 3 when made for a aircraft tire size with the 1×6.0 mm+ (11+17+23+29)×2.2 mm construction bead core yields a weight of 4.587 kg per bead core having a theoretical tensile strength of slightly less than 578K newtons.

Interestingly, the use of steel cord cable around a central core 33 provides an opportunity to drastically reduce the overall tire weight. The overall tensile strength of the bead core 33 of the present invention can be simplified as being equal to the sheaths tensile strength $T_s$ where $T_s$ is the sum of the wire strength of the steel sheath 35. The central core 33 can be assumed to act as a filler or spacer.

Using the inventive concept of cable core 30 having steel or other metal alloy core 33 means significant weight reductions can be gained. The cable bead cores 30 of FIGS. 2A through 2D have the following strengths and weights when used in an example aircraft tire of a size 50×20R22. The all steel wire bead core 3 also is shown below for comparison.

| Bead Core | Construction | Tensile Strength | Weight | Strength % | Weight Savings % | Weight per Tire Savings |
|---|---|---|---|---|---|---|
| FIG. 2A | 1 × 5.6 mm + (10 + 17 + 23 + 29) × 2.25 mm | 529,000 N | 2.96 kg | 92% | 35% | (7.14 lb) |
| FIG. 7 | 1 × 6.0 mm + (11 + 17 + 23 + 29) × 2.2 mm | 578,000 N | 4.58 kg | 100% | 0% | -0- |

The potential weight savings are substantial depending on the amount of bead strength that can be sacrificed. In cases were bead strength must be higher it is recommended higher strength steel wires be considered. In the example above steel cord 30 having High Tensile strength filaments 37 were employed having filament diameters of 0.25 mm. The resultant drop in tensile strength was only 8% while the bead weight savings was 35%. By employing Super Tensile Strength filaments or Ultra Tensile Strength filaments the weight savings can be held constant while the strength can be increased to equal or exceed that of the prior art bead. The only reason not to use the higher strength filaments is purely cost based. The above-referenced bead core 30 example using Super Tensile Strength filaments was effectively equal in cost. Assuming further strength reductions could be tolerated then normal strength filaments could result in a cost reduction coupled with actual weight reductions in those applications.

The above referenced bead core 3 construction of the prior art as shown in FIG. 7 is actually of a relatively lighter weight component than some of the bead cores used in off-road construction equipment which naturally have very large nominal bead diameters.

Figure 4A:
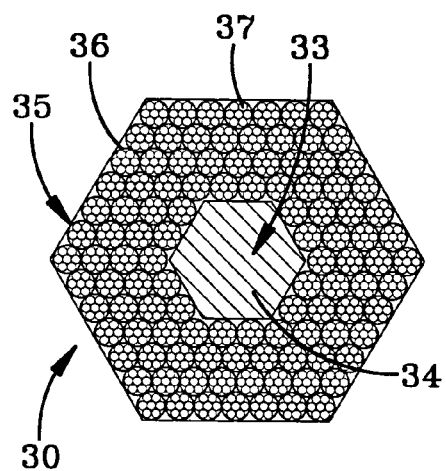
FIGS. 4A and 4B each shows the bead core of the present invention in a hexagonal cross-section having a central alloy core. In 4A a single wire or rod wound into a hoop of 360° is shown and in 4B multiple windings of a single or a plurality of wires is shown.
Figure 4B:
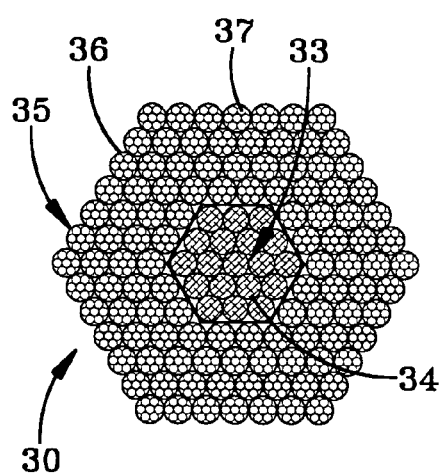

The bead cores 30 of FIG. 4A and 4B are a hexagonal construction commonly used in commercial truck tires. Such tires are commonly made in a 22.5 inch or 24.0 inch nominal bead diameters. The beads 30 using sheath cords 36 also will be much lighter in these types of tires.

Figure 5A:
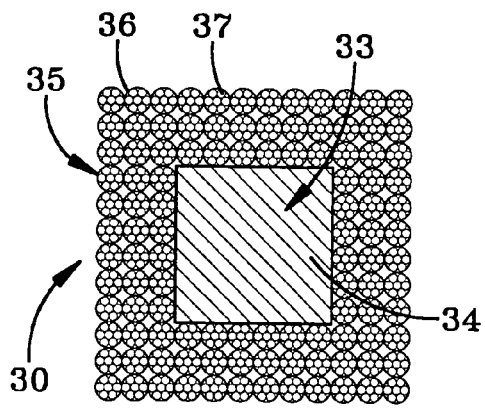
FIGS. 5A and 5B show the bead core of the present invention having a square or rectangular bead core, with a central core of a single wire in 5A or multiple windings or wires in 5B.
Figure 5B:
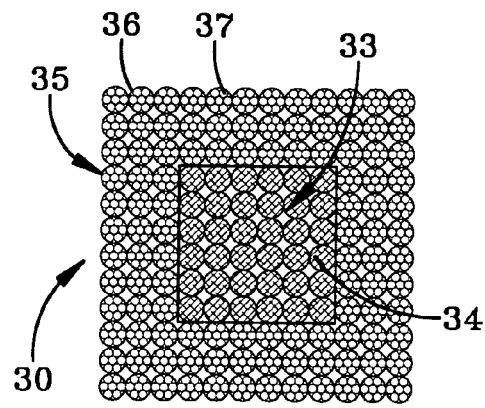

Radial farm tires commonly have bead diameters from 24.0 inches to 54 inches weighing up to about 12 pound per bead core. Some typically use a square strap construction. The bead 30 of FIGS. 5A and 5B could be substituted for those beads and a weight reduction would be possible here as well.

Figure 6A:
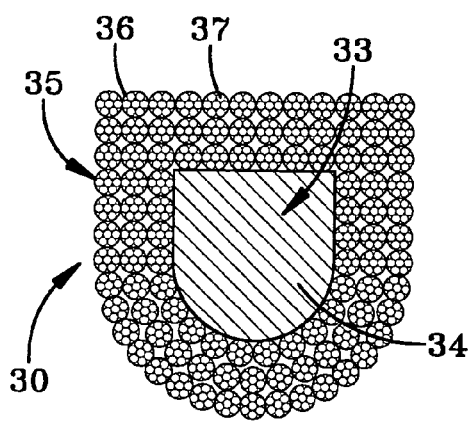
FIGS. 6A and 6B show a bead core of the present invention having a central core of a single wire in 6A or multiple windings or wires in 6B, the bead core having a round bottom cross-section.
Figure 6B:
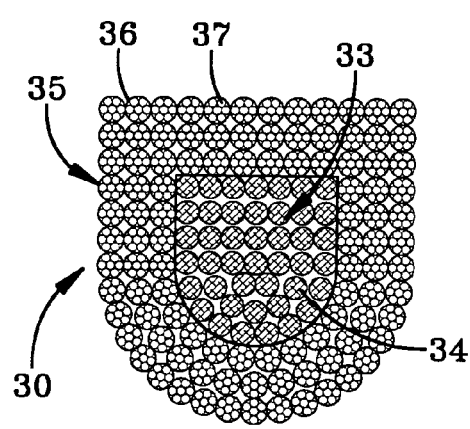

Off-road earthmover tires employ a variety of bead core shapes. The round bottom cross-section as shown in FIG. 6A and 6B could easily be substituted for these bead cores. A typical radial earthmover tire commonly employs this round bottom bead core in an all steel construction. These tires typically range from 25 inches nominal bead diameters to 63 inches and larger. As an example a 33.00 R51 Earthmover tire bead weights about 150 lb (68 k). Using two bead cores 30 of the present invention means a total bead core weight of 300 lb (136 kg) per tire.

A bead core 30 of the present invention could save from 3% to 35% of that weight at almost no cost penalty assuming normal or high tensile steel cord was used in place of the steel wire commonly used.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

What is claimed is:

1. A pneumatic radial tire having a bead portion provided therein with a cable bead core formed by a plurality of layers of sheath cords helically or spirally wrapping a central core, wherein:
   each cord is a steel cord having at least three filaments, and the central core is made from a composite or synthetic material having a weight less than steel.

* * * * *